Sept. 30, 1958 J. J. BAKER ET AL 2,854,650
SAFETY SIGNALING DEVICE FOR MOTOR VEHICLES
Filed June 1, 1956 2 Sheets-Sheet 1

INVENTORS
John J. Baker and
Cecil R. Weishuhn
BY
Reginald W. Hoagland
ATTORNEY

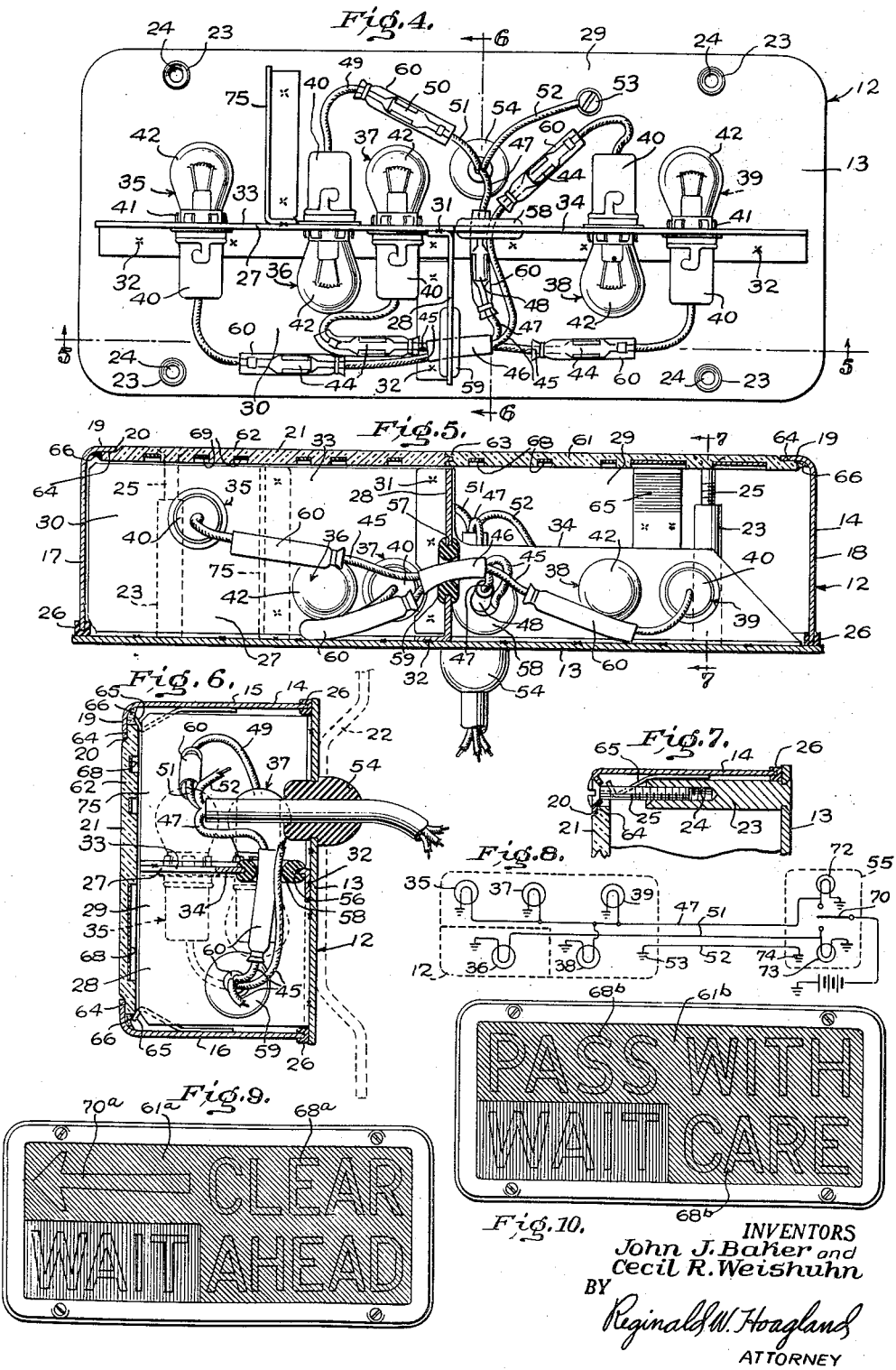

United States Patent Office 2,854,650
Patented Sept. 30, 1958

2,854,650
SAFETY SIGNALING DEVICE FOR MOTOR VEHICLES

John J. Baker, Alpena, and Cecil R. Weishuhn, Grand Blanc, Mich.

Application June 1, 1956, Serial No. 588,885

3 Claims. (Cl. 340—106)

This invention relates to new and useful improvements in signaling devices mounted on the rear of motor vehicles for indicating to vehicles in rear thereof and traveling in the same direction, whether or not it is safe to pass.

Generally, there is provided a rectangular boxlike casing of substantially greater width than its height and composed of a relatively thick mounting or back plate to which partitions are welded or otherwise fixed for dividing the interior of the casing into compartments, and a cover detachably secured to said plate and consisting of a top, a bottom, a pair of end walls, and a face wall with a large window therein that is closed by a translucent panel through which light rays from electric lamp bulbs in the compartments are visible. The translucent panel is of two different and distinct colors and has the entire upper half and the lower right-hand quarter portion thereof green, while its lower left-hand quarter portion is red. The light and partition arrangement is such that the green and red portions of the translucent panel are lighted separately to indicate that it is safe to pass or to wait before passing, respectively. The green portion is especially shaped to be representative of a hand pointing in the direction of the side to which the trailing vehicle should pass. Within a compartment behind the finger portion of the pointing hand, there is provided a lamp having a conventional flashing means incorporated therein for attracting attention to the direction the hand is pointing.

It is therefore an object of the invention to provide a novel and improved safety signaling device having different colored lights with indicia thereon for signaling the driver of a trailing vehicle that it is safe to pass, or that he should wait before attempting to pass because of oncoming or stopped traffic ahead, the approaching of a crest of a hill, or that there is a curve in the road ahead.

Another object of the invention is to provide, in a device of the character set forth, a novel and improved signal for safe passing of vehicles that not only indicates when it is safe to pass, but also indicates the side to which the trailing vehicle should pass.

A further object of the invention is to provide, in a signaling device as outlined above, a novel and improved partition construction that, in addition to dividing the interior of the casing into separate compartments, provides supports for light bulb sockets.

A still further object of the invention is to provide, in a device of the character set forth, a novel and improved light bulb socket and electric wire harness arrangement that permits easy and convenient replacement of defective parts in the electrical system.

It is also an object of the invention to provide a device of the above-indicated character, which is simple and substantial in construction, inexpensive to manufacture, and thoroughly efficient and practical in use.

These, together with various auxiliary features and objects of the invention will later become apparent as the following description proceeds, are attained by the present invention, preferred embodiments of which have been illustrated, by way of example only, in the accompanying drawings wherein:

Figure 4 is also a face view, but with the cover removed;

Figure 5 is a longitudinal horizontal section taken substantially on line 5—5 of Figures 2 and 4 with the cover attached;

Figure 6 is a transverse vertical section taken substantially on line 6—6 of Figure 4 and also having the cover thereon;

Figure 7 is a fragmentary sectional view taken substantially on line 7—7 of Figure 5;

Figure 8 is a wiring diagram of the electric circuit used with the signaling device; and Figures 9 and 10 are smaller face views similar to Figures 2 and 3, when the device is not signaling and showing thereon different indicia.

Figure 1:
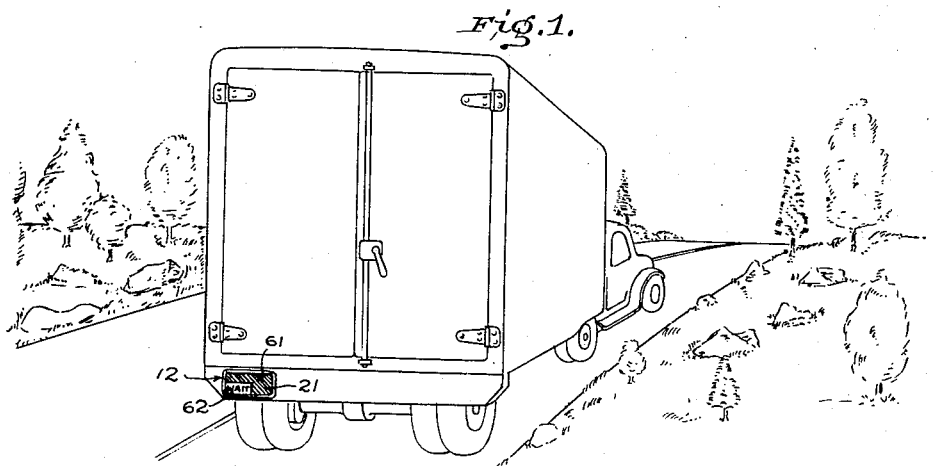
Figure 1 is a rear view of a tractor-trailer showing the improved signaling device attached thereto.

Referring now more specifically to the accompanying drawings wherein like numerals designate similar parts throughout the various views, the numeral 12 indicates generally a boxlike casing composed of a relatively thick back plate 13 which has one of its sides attached to the rear of a vehicle in any approved manner, and a cover 14 removably attached to the opposite side of said plate and consisting of a top wall 15, a bottom wall 16, a pair of side walls 17 and 18, and a face wall 19 provided with a large window opening 20 therein that is closed by a translucent panel 21. In Figure 6 of the drawings, there is shown in dotted lines, a bracket 22 which for example, provides one way of attachment of the back plate 13 of the casing 12 to a vehicle.

On the inner side of the back plate 13 and adjacent each of the four corners thereof, there is riveted, or otherwise secured, a stud 23 projecting into the interior of the cover 14 and having a threaded opening 24 therein into which a bolt 25 extending through the face wall 19 of the cover is threaded. The heads of the bolts 25 are countersunk into the outer side of the wall 19 and bear thereagainst so as to attach the cover 14 on the back plate 13 by forcing a sealing strip 26, carried along the edges of the top, bottom, and end walls of the cover, in sealing and frictional contact with the inner side of the back plate 13 upon tightening of said bolts into the studs 23.

Also secured on the inner side of the back plate 13, by welding or the like, is a horizontal partition 27 and a vertical partition 28 that divide the interior of the casing into a large compartment 29 consisting of substantially the upper half and the lower right-hand quarter portion of said casing interior and a smaller compartment 30 consisting of the remaining lower quarter portion. The partitions 27 and 28 are of flanged sheet metal construction, and it is the flanges of these partitions that are welded together, as at 31, and to the back plate, as at 32. The horizontal partition 27, while extending substantially the full length of the interior of the casing, is stepped in its width, as clearly shown in Figure 5, so that the portion 33 thereof to the left of the vertical partition 28 is of a width approximately the full depth of the casing interior and the portion 34 to the right of the partition 28 is of a width substantially half of the depth of said interior, thus rendering the portion of less width ineffective of shielding light rays from opposite sides thereof.

On the full width portion 33 of the horizontal partition 27, there are mounted three assemblies of light bulbs and sockets 35, 36, and 37, while on the portion 34 of said partition of less width, there are mounted two assemblies of light bulbs and sockets 38 and 39. The mounting and grounding of each assembly is accomplished by forcing the open end of an electric socket 40 with spring fingers 41 thereon through an opening in the partition and then inserting a light bulb 42 in the open end of the socket from the opposite side of the partition to that from which said socket was inserted. In Figure 5, it will be observed that the light bulbs 42 of the assemblies 35, 37, and 39 are at the upper side of the partition 27 and that the other two light bulbs of the assemblies 36 and 38 are at the lower side of said partition, which is for a purpose to be later set forth.

Electrically connected to and insulated from the ground connection of each socket 40 of the assemblies 35, 37, 38, and 39 is a short wire 43 and one of the connecting elements of a coupling 44. The other connecting element of the couplings 44 have short wires 45 thereon which are spliced together, as at 46, and have a single wire 47 with a further coupling 48 therein extending therefrom. The socket 40 of the other light bulb and socket assembly 36, which is in a separate circuit, also has a short wire 49 and coupling 50 electrically connecting it to a wire 51. The wires 47 and 51, together with another wire 52, which is grounded to the back plate 13, as at 53, extends into a heavy waterproof cord that leads outwardly of the casing through a watertight grommet 54 to a control mechanism 55, shown diagrammatically in Figure 8 of the drawings and mounted in the operator's compartment of the conveyance. In the extension of the different electric lines from the various sockets to the main wire 47 leading from the casing, it is necessary that the lines pass through partitions; therefore, openings 56 and 57 in the partitions 27 and 28 and with insulating grommets 58 and 59, respectively, are provided for such purpose. To further be assured that all lines are completely insulated, each of the electrical couplings 44, 48, and 50 is shrouded with an insulating sleeve 60 that has one end thereof crimped into engagement with an insulated portion of a wire by a metallic clip for retaining said sleeves in place.

The rectangular translucent panel 21, which covers practically the entire face of the casing and which is in close proximity to the forward free edges of the partition 28 and full width portion 33 of the partition 27, is shown as being constructed of two parts 61 and 62 of different colors and with cemented tongue-and-groove joints 63, as shown in Figure 5, connecting edge portions of the two different colored parts together. The part 61 is green in color and is of a size and shape to cover the larger compartment 29, which, as previously stated, consists of substantially the upper half and the lower right-hand quarter portion of the casing, while the part 62 is preferably red in color and covers substantially the remaining lower left-hand quarter portion in front of the compartment 30.

The panel 21 is of slightly greater overall size than the window opening 20 and is rabbeted, as at 64, along its edge portions so as to present a forward face flush with the forward surface of the face wall 19 of the casing upon securement of said panel against the inner side of said face wall. Spring clips 65, welded or otherwise secured to the top and bottom walls 15 and 16 of the cover of the casing and in engagement with outer edges of the panel 21, together with waterproof cement 66 completely around and adhering the outer edge of the panel to the face wall 19, retain said panel in place.

Figure 2:
Figure 2 is a face view of the signaling device when lighted to indicate it is safe to pass.
Figure 3:
Figure 3 is a similar view when the device is lighted to signal that trailing vehicles should wait before attempting to pass.

Recessed, as at 67, in the inner side of both parts 61 and 62 of the panel 21 is opaque indicia 68 and 69, respectively, there being included in the indicia 68 on the green part 61 an arrow 70 pointing to the left and followed by the words "Safe to pass," while the indicia 69 on the red part 62 consist of the single word "Wait," as clearly shown in Figures 2 and 3. The arrow 70, together with the words "Safe to" extend across the upper half of the panel 21, and the word "Pass" is therebeneath in the lower right-hand quarter portion of said panel. Behind the green part 61 of the panel which is of an overall shape simulating a hand pointing to the left, are the light bulbs 42 of the plurality of light bulb and socket assemblies 35, 37, 38, and 39 that are connected to the wire 47 of one circuit, while behind the red part 62 of the panel is the light bulb of the other light bulb and socket assembly 36 connected to the wire 51 of the other circuit. From the diagrammatic illustration of the control mechanism 55 in Figure 8, it can be seen that the wires 47 and 51 are connected to different contacts of a manually operated three-way switch 71, and that light bulbs 72 and 73 of colors similar to that of the parts 61 and 62 of the panel are mounted adjacent said switch and are wired to be lighted according to the circuit closed by the switch. The wire 52, which is grounded to the back plate 13 of the casing, is also grounded, as at 74, to the frame of the control mechanism, thus assuring completion of circuits upon engagement of the switch with either of its contacts.

Attention is now directed especially to Figure 4 wherein there is shown an auxiliary vertical partition 75 within the interior of the casing and separating the upper left-hand end portion of the larger compartment 29 where the light bulb of the light bulb and socket assembly 35 is arranged from the remainder of said compartment. This separated portion of the compartment 29 is directly in arrears of the portion of the green part 61 of the translucent panel where the arrow 70 appears. The light bulb of the light and socket assembly 35 differs from the other assemblies in that it has a conventional flashing means incorporated therein for attracting attention to the direction the arrow and illuminated hand are pointing.

In Figures 9 and 10, there are illustrated modified translucent panels which are of the same general arrangement of green and red parts, but they differ in that the green parts 61ª and 61ᵇ, respectively of these panels have different indicia 68ª and 68ᵇ thereon to indicate that it is safe to pass. The indicia 68ª in Figure 9 includes an arrow 70ª with a longer shaft than the arrow shown in the preferred embodiment of the invention, and the words "Clear ahead" at the right-hand side of the green part 61ª of the panel with the word "Clear" directly above the word "Ahead." The indicia 68ᵇ shown in Figure 10 further differs in that the arrow is omitted and a word "Pass" of a phrase "Pass with care" is flashed instead of an arrow. In this case, the words "Pass with" are across the upper half of the panel and the word "Care" is beneath the word "With."

From the above description, it can be seen that there is provided a signaling device to be mounted upon the rear of a motor vehicle for indicating to vehicles in rear thereof and traveling in the same direction that it is safe to pass, or that the vehicle trailing or approaching from the rear should wait before attempting to pass. In addition to signaling whether or not it is safe to pass, the present invention also incorporates a novel and improved manner of indicating the side to which it is safe for the trailing vehicle to pass.

In view of the foregoing description, taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there are herein shown and described preferred embodiments of the invention, various changes may be made without departing from the spirit or full intendment of the invention.

What is claimed is :

1. A signaling device comprising a casing adapted to be secured to a motor vehicle and faced rearwardly thereof, said casing being of a rectangular shape and of considerably greater width than its height and having a window opening in its rearward facing wall of a like but smaller rectangular shape, a translucent panel secured to said casing and closing the window opening, a horizontal partition member in said casing substantially midway of its height and extending approximately the full length of the interior of the casing, said horizontal partition member being stepped in its width substantially midway of its length so as to provide one end portion of full depth of the interior of the casing and another end portion of less width, a vertical partition in said casing substantially midway of its length and of a width equal to the full depth of the interior of the casing, said vertical partition being located below said horizontal partition and together with said end portion of said horizontal partition of full width divides the interior of the casing into a large fully closed compartment consisting of substantially the upper half and lower right-hand quarter portion of the interior of the casing and a smaller fully closed compartment consisting of the remaining lower quarter portion, opaque indicia on the translucent panel at the larger of said fully closed compartments indicating that it is safe to pass, other indicia on the translucent panel at the smaller of said fully closed compartments indicating to wait before attempting to pass, lamp bulb sockets mounted on said horizontal partition and with some of their open lamp bulb receiving ends at different sides of said partition, lamp bulbs in said sockets and positioned in each of said fully closed compartments, and means for selectively lighting said lamp bulbs, in different of said fully closed compartments at different times.

2. A signaling device comprising a casing adapted to be secured to a motor vehicle and facing rearwardly thereof, said casing being of a rectangular shape and of considerably greater width than its height and having a window opening in its rearward facing wall of a like but smaller rectangular shape, a translucent panel closing the window opening of said casing and having substantially the upper half and lower right-hand quarter portion thereof of a different color than the smaller remaining lower left-hand quarter portions thereof, partitions in said casing of a width equivalent to the full depth of said casing and extending along lines demarcating different colors of said panel and dividing the interior of the casing into fully closed compartments, illuminating lamps in each of said compartments and shielded from the other fully closed compartment by said partitions, selective lighting means for illuminating the lamps behind panel portions of different colors at different times, opaque indicia on the larger of the different color portions of the translucent panel indicating that it is safe to pass, and other indicia on the smaller and different colored portion of the translucent panel indicating to wait before attempting to pass, said larger of the different colored portions of said panel because of it being shaped like that of a pointing hand, indicates to the driver of a trailing vehicle the side for passing.

3. A signaling device comprising a casing adapted to be secured to a motor vehicle and faced rearwardly thereof, said casing being of a rectangular shape and of considerably greater width than its height and composed of a back plate, and a cover having a top wall, a bottom wall, a pair of end walls, and a face wall provided with a window opening therein of a like but slightly smaller rectangular shape, a translucent panel secured to the cover of the casing and closing the window opening, fastener elements removably attaching said cover to the forward side of said back plate, a horizontal partition member secured to said back plate substantially midway of its height and extending approximately the full length of the interior of the casing, said horizontal partition member being stepped in its width substantially midway of its length so as to provide one end portion of full depth of the interior of the casing and another end portion of a width approximately half the depth of the interior of the casing and with its forward edge spaced rearwardly from said translucent panel, a vertical partition secured to said back plate substantially midway of its length and of a width equal to the full depth of the interior of the casing, said vertical partition being located below said horizontal partition and together with said end portion of said horizontal partition of full width divides the interior of the casing into a large fully closed compartment consisting substantially of the upper half and lower right-hand quarter portion of the interior of the casing and a smaller fully closed compartment consisting of the remaining lower quarter portion, opaque indica on the translucent panel at the larger of said compartments indicating that it is safe to pass, other indicia on the translucent panel at the smaller of said compartments indicating to wait before attempting to pass, said horizontal partition having a plurality of openings extending through both of its portions of different depths, lamp bulb sockets detachably mounted in said openings in said horizontal partition and arranged with some of their open lamp bulb receiving ends at different sides of said horizontal partition, lamp bulbs in said sockets and positioned in each of said fully closed compartments, and means for selectively lighting said lamp bulbs in different of said fully closed compartments at different times.

References Cited in the file of this patent

UNITED STATES PATENTS

| | | |
|---|---|---|
| 1,294,527 | Olmsted | Feb. 18, 1919 |
| 2,021,319 | McGee | Nov. 19, 1935 |
| 2,044,300 | Heans | June 16, 1936 |
| 2,293,850 | Robinson | Aug. 25, 1942 |
| 2,673,307 | Weishuhn | Mar. 23, 1954 |

FOREIGN PATENTS

| | | |
|---|---|---|
| 890,321 | Germany | Sept. 17, 1953 |